Jan. 15, 1924.
L. BAYARD ET AL
APPARATUS FOR DESTROYING WATER LILIES OR LIKE MARINE GROWTHS
Filed Nov. 25, 1921    4 Sheets-Sheet 1
1,481,177
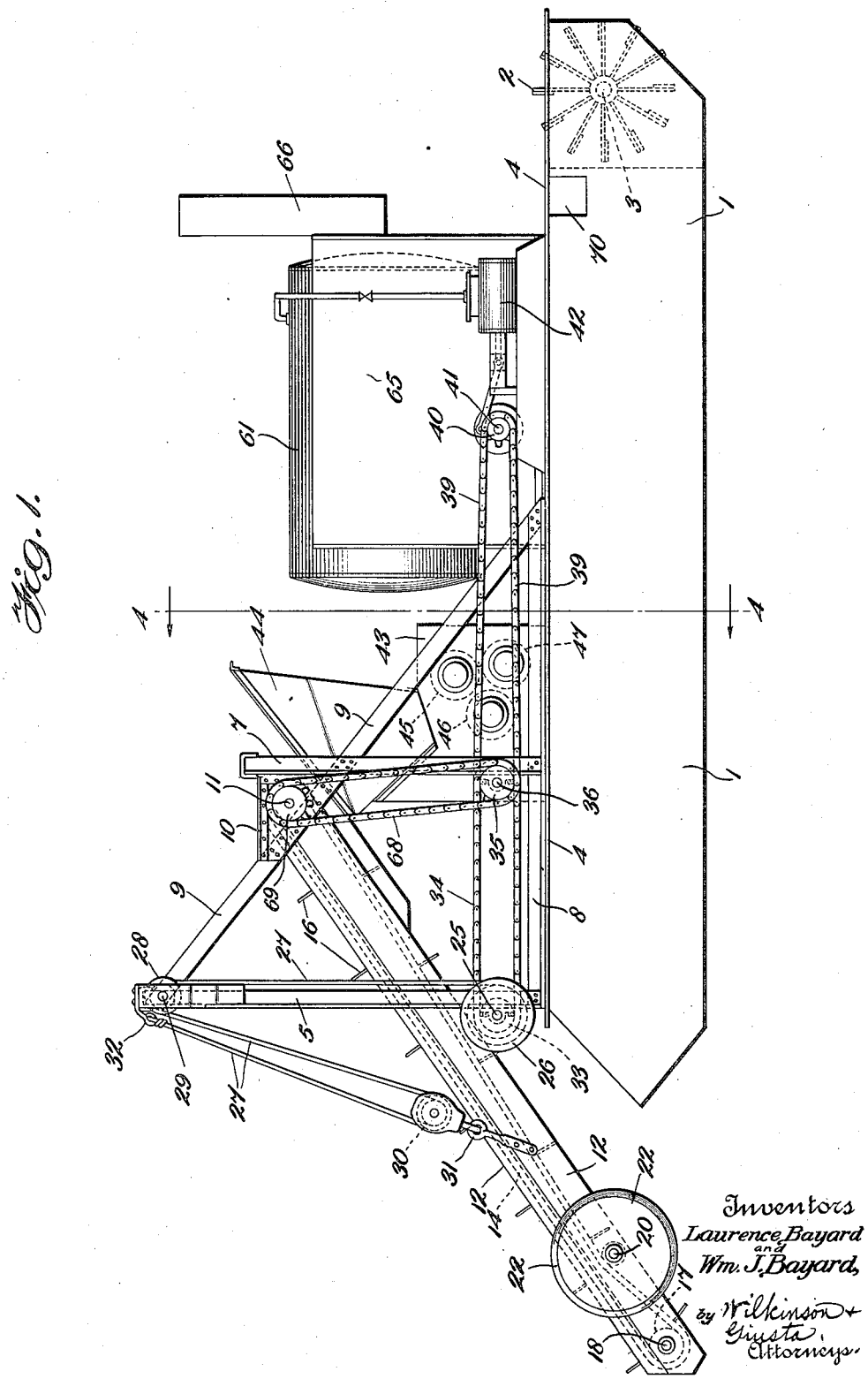

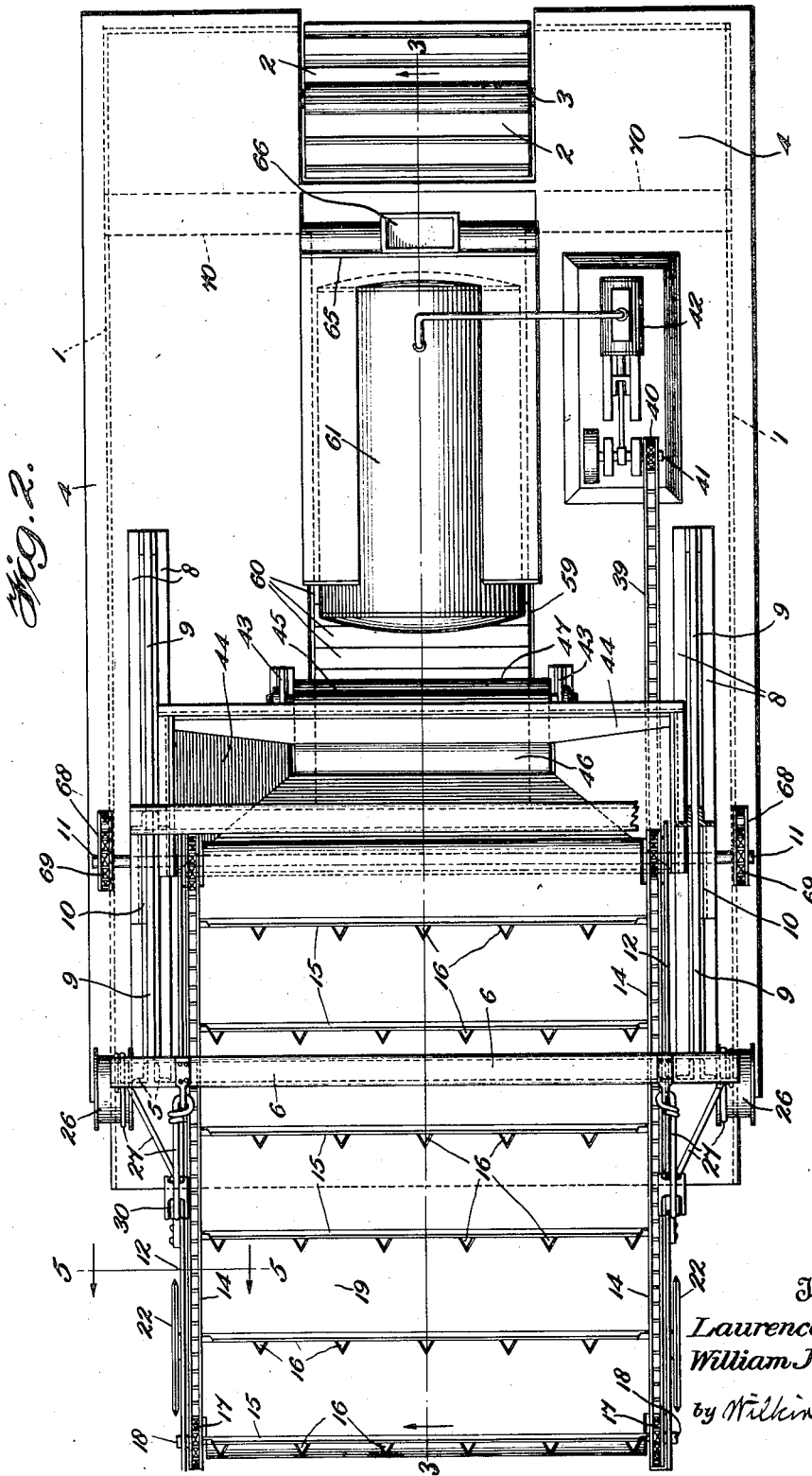

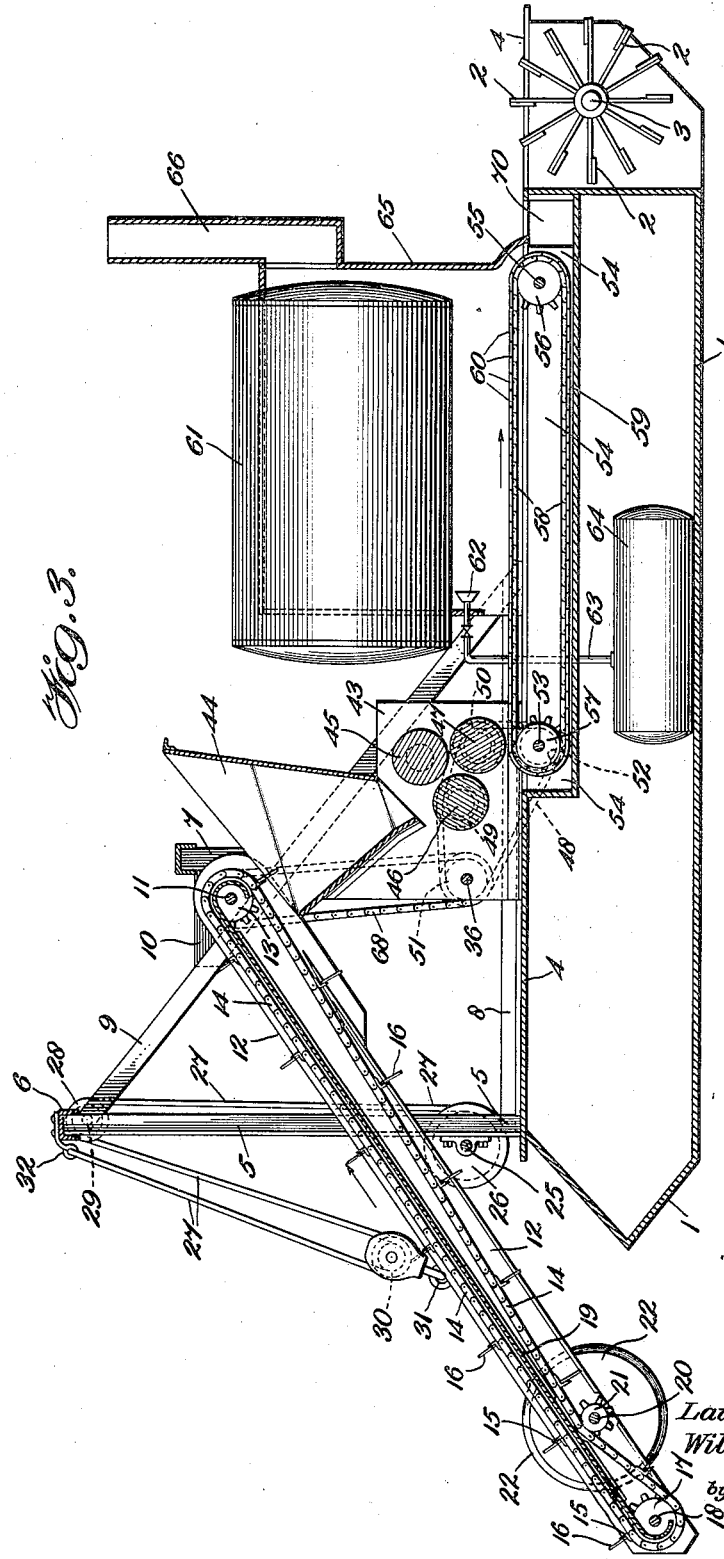

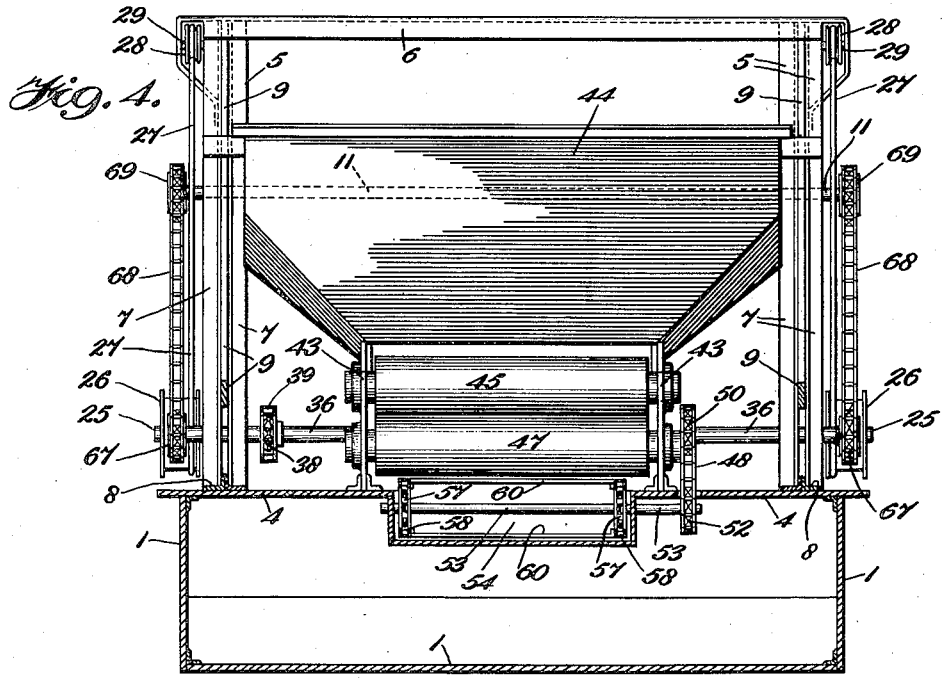
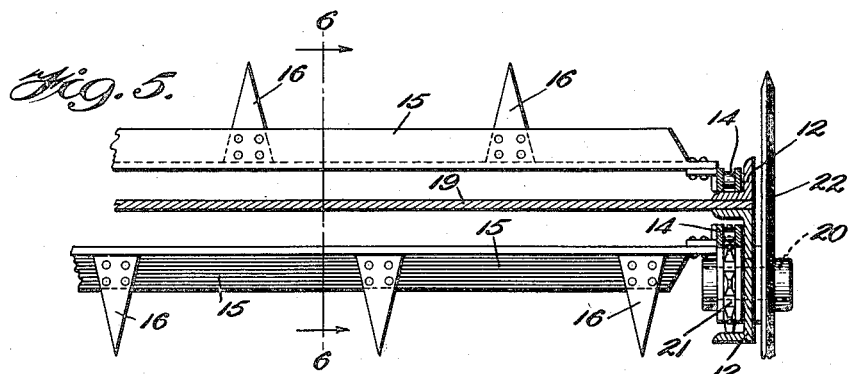
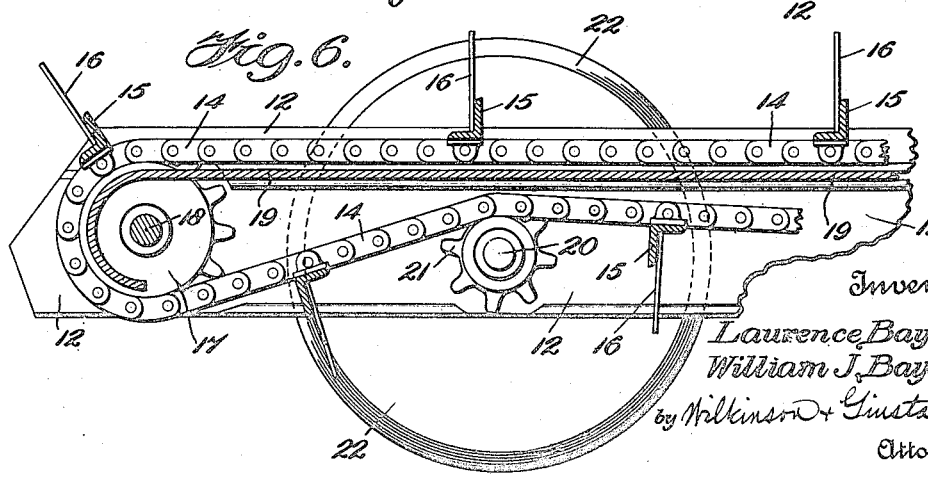

Patented Jan. 15, 1924.                                        1,481,177

UNITED STATES PATENT OFFICE.

LAURENCE BAYARD AND WILLIAM JOSEPH BAYARD, OF NEW IBERIA, LOUISIANA.

APPARATUS FOR DESTROYING WATER LILIES OR LIKE MARINE GROWTHS.

Application filed November 25, 1921. Serial No. 517,645.

*To all whom it may concern:*

Be it known that we, LAURENCE BAYARD and WILLIAM JOSEPH BAYARD, citizens of the United States, both residing at New Iberia, in the parish of Iberia and State of Louisiana, have invented certain new and useful Improvements in Apparatus for Destroying Water Lilies or like Marine Growths; and we do hereby declare the following to be a full, clear, and exact description of the invention, such as will enable others skilled in the art to which it appertains to make and use the same.

This invention relates to apparatus for destroying marine growths and more especially water lilies and has for its object to provide a device of this character which will be simple in construction, comparatively inexpensive to operate and more efficient in action than those which have been heretofore proposed.

In the canals, bayous and other small streams of the southern United States, navigation and drainage are both frequently seriously impeded and in some instances stopped entirely by the excessive growth of various marine vegetation such as water lilies and the like and it is the principal object of this invention to provide an efficient apparatus for removing the said marine growths from their beds and destroying the same to the end that navigation and drainage may be benefited thereby.

In the sluggish streams of the Gulf States or other tropical or subtropical waters generally, the African lily has become a great pest. It floats on top of the water and spreads like a mat over the surface of the water, interfering with drainage or navigation, and often actually choking the stream itself. It is the principal purpose of this invention to remove and utilize this marine growth.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a side elevational view of an apparatus constructed in accordance with the present invention.

Fig. 2 is a top plan view of the parts shown in Fig. 1.

Fig. 3 is a central vertical sectional view of the parts shown in Figs. 1 and 2 taken on the line 3—3 of Fig. 2.

Fig. 4 is a transverse sectional view taken on the line 4—4 of Fig. 1, looking in the direction of the arrows.

Fig. 5 is an enlarged fragmentary sectional view of one of the conveyer mechanisms taken approximately on the line 5—5 of Fig. 2, and Fig. 6 is an enlarged longitudinal sectional view taken on the line 6—6 of Fig. 5.

Referring more specifically to Figs. 1, 2 and 3 1 indicates the hull or body portion of a suitable vessel, such as a scow, which may be constructed of any suitable material, such as wood or metal. The said hull may be provided with a suitable propelling means such as the stern paddle wheel 2 mounted upon shaft 3 driven from any suitable source of power, not shown. The said hull is also provided with a deck 4, to which is secured, near the bow or forward part, the upright supporting members 5 of angle iron or other suitable construction. The members 5 are spaced at opposite sides of the hull and their upper ends may be suitably braced by the transverse channel member 6, as will be clear from the drawings.

Somewhat to the stern of said members 5 and spaced therefrom, we provide a second pair of vertical supporting members 7 in alignment with the said members 5 and both sets of vertical members are suitably braced at their bases by the angle members 8 and at or near their upper portions by the angularly disposed bracing member 9, of Figs. 1 and 3. Secured to the upright member 7 and to the bracing members 9, are a pair of bracket members 10 provided with suitable bearings in which is journaled a shaft 11, extending substantially the full width of the hull. Rotatably mounted upon the said shaft 11 is a conveyer frame work 12, preferably of angle or channel iron construction, which frame work is adapted to pivot about the said shaft 11, for a purpose to be more fully disclosed below.

Rigidly mounted upon the said shaft 11 are a pair of sprocket wheels 13 about which pass the chains 14 to which are secured in any suitably manner the transverse angle members 15 carrying the prongs or pointed finger members 16, as will be clear from Figs. 1, 2, 5 and 6. The said chains 14, at their other ends, pass around sprockets 17 carried by a shaft 18 suitably journaled in the other end of the frame 12. A stationary sheet iron apron member 19 is rigidly secured to the frame work 12 and underlies the upper run of the chains 14, as will be clear from Figs. 3, 5 and 6.

Also journaled in the conveyer frame work 12, near its lower end, are the stub shafts 20, best shown in Figs. 3, 5 and 6, which shafts carry the sprocket wheels 21 adapted to be engaged by the said chains 14. The said stub shafts 20 also carry the disk cutter members 22 which are adapted to sever the lilies or other growths as they are raised from their beds, as will more fully appear below.

Suitably journaled upon the upright members 5 is a transverse shaft 25 carrying a pair of drums 26 around which are wound the cables 27 which cables pass upwardly over pulleys or sheaves 28 journaled on the stub shafts 29 near the upper ends of the said upright members 5. After passing over the said pulleys 28, the said cables 27 pass downwardly around the pulley or sheave 30, which is pivotally secured to the frame work 12 as by the eye 31. The said cables 27 pass from the sheaves 30 upwardly and have their ends secured to the transverse bracing member 6, as at 32, as will be clear from Figs. 1 and 3.

The shaft 25 may be driven in any suitable manner, as for example by means of the sprocket 33 carried thereby, around which passes the chain 34 which is driven from a sprocket 35 mounted upon a shaft 36 suitably journaled upon the upright members 7. The said shaft 36 may in turn be driven by means of a sprocket 38 around which passes a chain 39 driven from a sprocket 40 mounted upon the crank shaft 41 of the steam engine or other prime mover 42.

Suitably supported between the upright members 7 is a hopper member 44 which is adapted to receive the water lilies from the upper end of the conveyer above described and to conduct them to the pressure rolls 45, 46 and 47 which are suitably journaled in the vertical bearing plates 43 secured to the deck 4. The said rolls 45, 46, and 47 are suitably spaced apart a slight distance and the rolls 46 and 47 are adapted to be positively driven by means of a chain 48 engaging sprockets 49 and 50 rigid with the said rolls, and driven, by a sprocket 51 carried by the shaft 36. The said chain 48 also passes around a sprocket 52 rigid with a shaft 53 suitably journaled in a longitudinal recess 54 which extends from a point below the pressure rolls 45, 46 and 47 to a point adjacent the paddle wheel 2, as will be clear from Fig. 3. Near the other end of the said recess 54 is journaled another shaft 55 which carries a pair of sprockets 56. A shaft 53 is also provided with a pair of sprockets 57 and the said sprockets 56 and 57 are engaged by the chains 58 of a traveling conveyer 59, as will be clear from the drawings. The said conveyer 59 may be of the slat type and the slats or transverse members 60 may be secured to the chains 58 in any suitable manner.

Above the stern portion of the longitudinal recess 54 there is provided a steam boiler 61 adapted to be fired by a fuel oil burner 62 fed by means of a pipe 63 from a fuel oil tank 64 located within the hold of the vessel. The said boiler is surrounded by the furnace walls 65 and a flue or chimney 66 leads from the interior of the furnace to convey away the products of combustion.

The shaft 36, which is journaled upon the upright members 7, is further provided with a pair of sprockets 67 which are engaged by chains 68 which pass around similar sprockets 69 rigidly mounted upon the shaft 11 whereby power may be transmitted from the said shaft 36 to the chains 14 of the first described conveyer.

The operation of the apparatus is as follows: The vessel may be moved to any desired location under its own power by means of the paddle wheel 2 during which time the conveyer 12 may be raised by means of the cables 27, so that its lower end is out of the water entirely. This may be accomplished through the medium of the steam engine 42 which transmits power through sprocket 40, chain 39 and sprocket 38 to the shaft 36 which in turn transmits the power through the sprocket 35, chain 34, and sprocket 33 to the shaft 25 upon which is mounted the drums 26 around which the said cables 27 are wound.

After the vessel has reached its location the conveyer 12 may be lowered either by reversing the motion of the engine 42 or by suitable clutches, not illustrated, associated with the drums 26 which will release the said drums. The conveyer 12 will then be set in motion, power from the engine being transmitted thereto from the shaft 36 by means of the chains 68 and sprockets 67 and 69, whereupon the prongs 16 of the conveyer will catch the lilies or other growths and will tear them from the river bed, the said lilies will be carried upwardly by the conveyer 12 and when they reach the upper end thereof they will be deposited into the hopper or chute 44 from whence they will pass between the pressure rolls 45 and 46 where a portion of the water associated therewith will be extracted therefrom. The said growths will then pass between the rolls 45 and 47 where another portion of the water will be extracted therefrom and they will then fall upon the travelling conveyer 59, while the water which has been separated will drain into the longitudinal recess or passage 54, passing under the furnace 65. The water lilies which have been deposited upon the travelling conveyer 59 will be carried into the said furnace beneath the fuel oil burner 62 and will be subjected to the action of the heat therefrom to the end that they will be killed. When scorched and dead fragments and ashes reach the stern end of the conveyer they will fall therefrom back into the water which is flowing through the passage or recess 54 and this latter will carry them by means of the transverse passages 70 to either side of the hull where they will be discharged overboard.

It will thus be seen that we have provided a comparatively simple and efficient means whereby water lilies and other marine growths may be continuously removed from their beds in rivers and other small streams, may have the water associated with them extracted therefrom to the end that they may be more or less consumed and completely killed by exposure to the heat of the combustion necessary to provide power for the engine 42, and after being entirely killed the refuse is again returned to the original water which serves as a vehicle for conveying them back to the stream from which they were originally taken. In the scorched form, however, they have lost the power of reproduction, are no longer a tangled mass, and do not appreciably interfere either with navigation or drainage.

Instead of burning the lilies or destroying the vitality by charring or heating the same, it may be desirable to use the crushed and partly dried plants in the manufacture of paper or for other purposes, and in such case, it will be necessary to provide suitable means for taking care of the material, such for instance as a suitable baling press or presses and means for conveying the treated material to said press or presses. In this way the treated plants may be bound into bales and used for the manufacture of paper or for other purposes, and in such case it will not be necessary to burn or heat the plants at all, but merely to extract the superfluous water from the same.

It is obvious that those skilled in this art may vary the details of construction as well as the arrangement of parts without departing from the spirit of the invention, and therefore we do not wish to be limited to the above disclosure except as may be required by the claims.

What we claim is:—

1. In a device of the class described the combination of means for removing floating marine growths from the surface of the water; means for separating from said growths a substantial portion of the water associated therewith; means for conducting said growths from said first named to said second named means; means adapted to destroy said growths; means for transferring said growths from said separating means to said destroying means; and means whereby said growths may be conveyed away from said destroying means.

2. In a device of the class described the combination of movable means for removing floating marine growths from the surface of the water; pressure means for separating from said growths a substantial portion of the water associated therewith; means for conducting said growths from said first named to said second named means; means adapted to heat and destroy said growths; means for transferring said growths from said separating means to said destroying means; and means whereby said growths may be conveyed away from said destroying means.

3. In a device of the class described the combination of a travelling conveyer adapted to remove floating vegetable marine growths from the surface of the water; a plurality of pressure rolls adapted to receive said growths and to separate them from a substantial portion of the water associated with them; a combustion chamber; means adapted to receive said growths from said rolls and to convey them to said combustion chamber, whereby they may be killed and partly consumed; and means whereby the residue of the combustion may be conveyed away from said chamber.

4. In a device of the class described the combination of a travelling conveyor adapted to remove vegetable marine growths from their beds; a hopper adapted to receive said growths from said conveyer; a plurality of pressure rolls adapted to receive said growths from said hopper and to separate them from a substantial portion of the water associated with them; means to receive and convey away said water; a combustion chamber; and a second travelling conveyer adapted to receive said growths from said rolls, convey them through said chamber, and discharge the residue back into said water.

5. In a device of the class described the combination of a support; a travelling conveyer having a framework pivotally secured to said support, said conveyer being adapted to remove vegetable marine growths from their beds; means for moving said conveyer about its pivot; a hopper adapted to receive said growths from said conveyer; a plurality of pressure rolls adapted to receive said growths from said hopper and to separate them from a substantial portion of the water associated with them; a passage adapted to receive and convey away said water; a combustion chamber; and a second travelling conveyer partially located in said passage, adapted to convey said growths from said rolls through said chamber and to discharge the residue back into said water.

6. In an apparatus of the class described the combination of a movable support; a travelling conveyer, having a framework pivotally secured to said support, said conveyer being provided with means adapted to engage and pull vegetable marine growths from their beds; means for moving said conveyer framework about its pivot; a hopper secured to said support adapted to receive said growths from said conveyer; a plurality of pressure rolls adapted to receive said growths from said hopper and to separate them from a substantial portion of the water associated with them; a passage adapted to receive and convey away said water; a combustion chamber; a second travelling conveyer partially located in said passage, adapted to convey said growths from said rolls through said chamber whereby they may be killed and partly consumed, and to discharge the residue back into said water; and means for moving said conveyers and rolls.

7. In a device of the class described the combination of a support; a travelling conveyer having a framework pivotally secured to said support, said conveyer being adapted to remove vegetable marine growths from their beds; means for moving said conveyer about its pivot; a plurality of cutter members carried by said framework, adapted to sever portions of said growths as they are carried along by said conveyer; a hopper adapted to receive said growths from said conveyer; a plurality of pressure rolls adapted to receive said growths from said hopper and to separate them from a substantial portion of the water associated with them; a passage adapted to receive and convey away said water; a combustion chamber; and a second travelling conveyer partially located in said passage, adapted to convey said growths from said rolls through said chamber and to discharge the residue back into said water.

8. In an apparatus of the class described the combination of a movable support; a travelling conveyer, having a framework pivotally secured to said support, said conveyer being provided with means adapted to engage and pull vegetable marine growths from their beds; means for moving said conveyer framework about its pivot; a pair of revolving cutter members carried by said framework, adapted to sever portions of said growths as they are carried along by said conveyer; a hopper secured to said support adapted to receive said growths from said conveyer; a plurality of pressure rolls adapted to receive said growths from said hopper and to separate them from a substantial portion of the water associated with them; a passage adapted to receive and convey away said water; a combustion chamber; a second travelling conveyer partially located in said passage, adapted to convey said growths from said rolls through said chamber whereby they may be killed and partly consumed, and to discharge the residue back into said water; and means for moving said conveyers, cutters and rolls.

9. In an apparatus of the class described the combination with a floating support of a travelling conveyer having a framework pivotally secured to said support, said conveyer being provided with a plurality of pointed members adapted to engage and tear vegetable marine growths from their beds; means comprising cables and a plurality of pulleys and drums for raising and lowering said conveyer about its pivot; a plurality of rotatable cutter members carried by said framework, and driven from said conveyer; a plurality of pressure rolls adapted to separate said growths from a substantial portion of the water associated with them; a hopper adapted to receive said growths from said conveyer and to feed them to said rolls; a passage in said support adapted to receive and carry away said water; a source of power; a liquid vaporizer, provided with a combustion chamber, adapted to furnish pressure to said source of power; a second travelling conveyer partially located in said passage, adapted to convey said growths from said rolls through said combustion chamber whereby they may be killed and partly consumed, and to discharge the residue back into said water; and connections between said source of power and said rolls and conveyers for moving the latter.

LAURENCE BAYARD.
WILLIAM JOSEPH BAYARD.